United States Patent [19]

Smith, Jr. et al.

[11] 3,873,776

[45] Mar. 25, 1975

[54] ALARM ARRANGEMENT FOR A TIME-DIVISION MULTIPLEX, PULSE-CODE MODULATION CARRIER SYSTEM

[75] Inventors: James S. Smith, Jr.; William R. Smith, both of Lynchburg, Va.

[73] Assignee: General Electric Company, Lynchburg, Va.

[22] Filed: Jan. 30, 1974

[21] Appl. No.: 437,728

[52] U.S. Cl. .............................. 179/15 BY, 179/5 R

[51] Int. Cl. .............................................. H04j 3/14

[58] Field of Search............ 179/15 BF, 15 BY, 5 R

[56] References Cited

UNITED STATES PATENTS

| | | | |
|---|---|---|---|
| 3,686,443 | 8/1972 | Kavanaugh | 179/15 BY |
| 3,710,056 | 1/1973 | Tomozawa | 179/15 BY |
| 3,732,376 | 5/1973 | Chatelon | 179/15 BY |

*Primary Examiner*—Ralph D. Blakeslee

[57] ABSTRACT

In a multi-channel, time-division multiplex, pulse-code modulation system, sequential pulses from each channel comprise a frame, and a predetermined number of frames comprise a superframe. In the system, signals are provided in place of selected pulses to indicate which channels are idle and which channels are busy. An additional function or feature is provided by transmitting alarm signals, representing selected alarm conditions, over selected channels in a selected frame when the selected channels are idle. Received alarm signals may be used to provide any desired indication or function.

3 Claims, 4 Drawing Figures

I IS NORMAL 7 OR 8 BIT INFORMATION CODE
P IS PRIMARY SIGNALLING CODE
S IS SECONDARY SIGNALLING CODE
F IS FRAMING BIT

ALARM ARRANGEMENT FOR A TIME-DIVISION MULTIPLEX, PULSE-CODE MODULATION CARRIER SYSTEM

BACKGROUND OF THE INVENTION

Our invention relates to a time-division multiplex, pulse-code modulation system, and particularly to an arrangement for sending and receiving alarm signals over the system without the necessity of additional channels and without degrading the existing channels of the system.

Communication systems using time-division multiplexing and pulse-code modulation are used to provide a plurality of relatively low noise, easily regenerated communication channels over a single communication circuit. One such system, designated the D2/D3 system by the Bell Telephone System, is described in considerable detail in "The Bell System Technical Journal," Volume 51, October 1972, beginning at page 1641. The D2/D3 system provides 24 channels over two T1 lines, one line being used for each direction of transmission. In this system, the polarity and amplitude of the signal in each of the 24 channels is sampled 8,000 times per second. This polarity and amplitude sample is encoded into eight binary pulses or bits, one bit representing polarity and the other seven bits representing weights from 64 down to 1. The bits are sequentially combined for each channel, and the sequences for each of the 24 channels are sequentially combined to form what is designated a frame. A single framing or synchronizing pulse is provided after the bits for the 24 channels. Twelve such frames comprise what is designated a superframe. In order that signaling can be provided for such functions such as channel idle or busy conditions, selected bits for each channel in selected frames of a superframe are utilized. The system as described, and insofar as we are aware, is not capable of providing any other functions, such as alarms. And, where the system is utilized to provide telephone service to a number of subscribers remote from a telephone central office, such alarm functions are very desirable if not absolutely essential.

Accordingly, an object of our invention is to provide an improved alarm arrangement for a time-division multiplex, pulse-code modulation system.

A relatively specific object of our invention is to provide alarm functions in a time-division multiplex, pulse-code modulation system without the necessity of additional channels or timing functions.

Another relatively specific object of our invention is to provide alarm functions in a time-division multiplex, pulse-code modulation system without reducing the number or degrading the quality of the existing channels already in the system.

SUMMARY OF THE INVENTION

Briefly, these and other objects are achieved in accordance with our invention by assigning desired alarm functions to specific channels in the time-division multiplex, pulse-code modulation system. When an assigned channel is idle, such as indicated by an on-hook condition of a telephone, the alarm assigned to that channel may be transmitted to a receiver. The alarm signal, when received, may be utilized in any way desired. However, when a channel having an alarm condition assigned to it is in the busy condition, such as indicated by a telephone being off-hook, the telephone functions take priority over the alarm functions, so that the alarm is not transmitted. Thus, the alarm functions can be provided over channels when idle, thus providing additional functions or features without affecting, reducing, or degrading the voice channels.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

In the following description, we have shown our invention being used with a D2/D3 carrier system. However, it is to be understood that our improved alarm arrangement can be used in almost any type of time-division multiplex, pulse-code modulation system.

Figure 1:
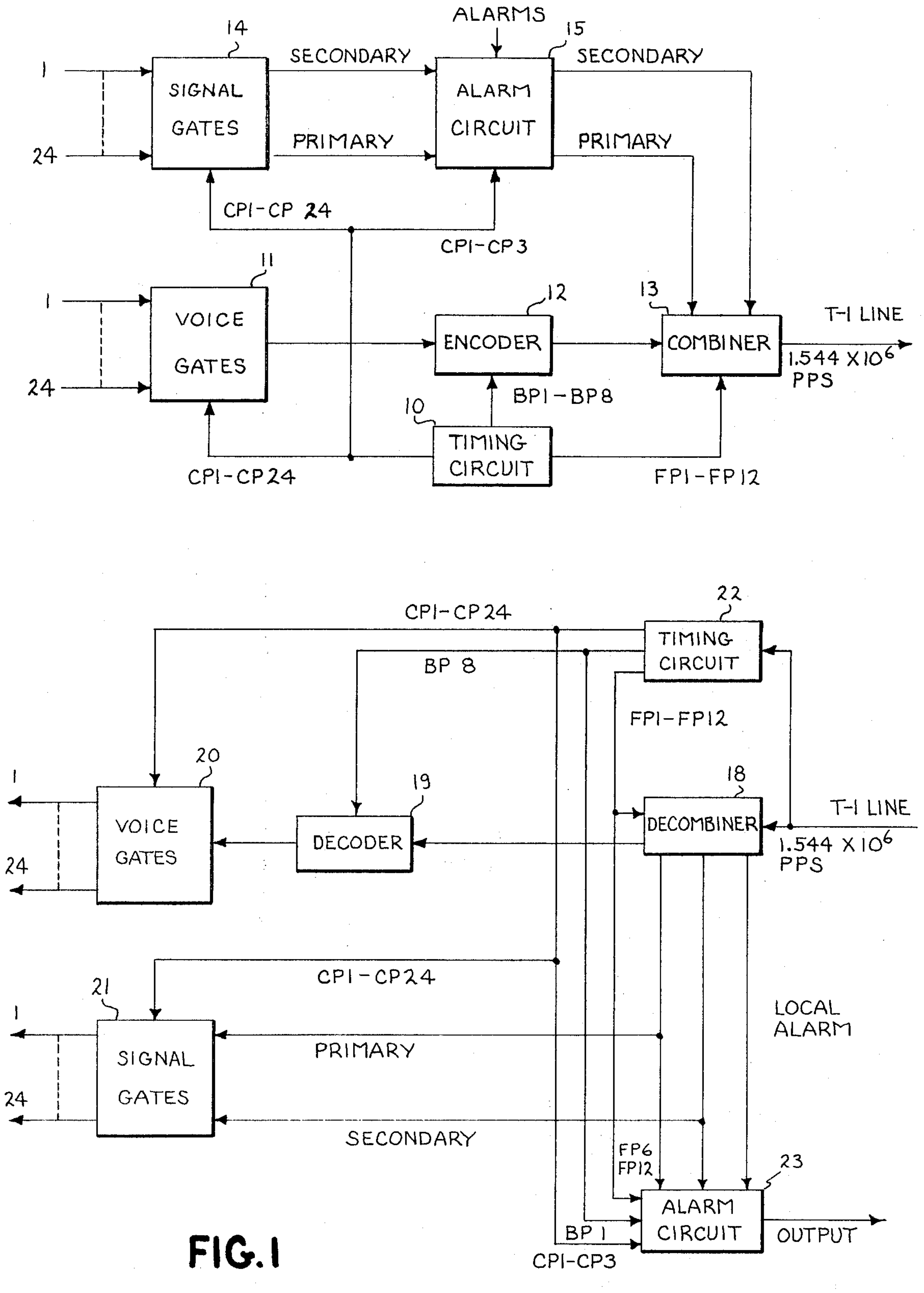
FIG. 1 shows a block diagram of the transmitter and receiver of a time-division multiplex, pulse code modulation D2/D3 carrier system which is provided with our improved alarm arrangement.
Figure 2:
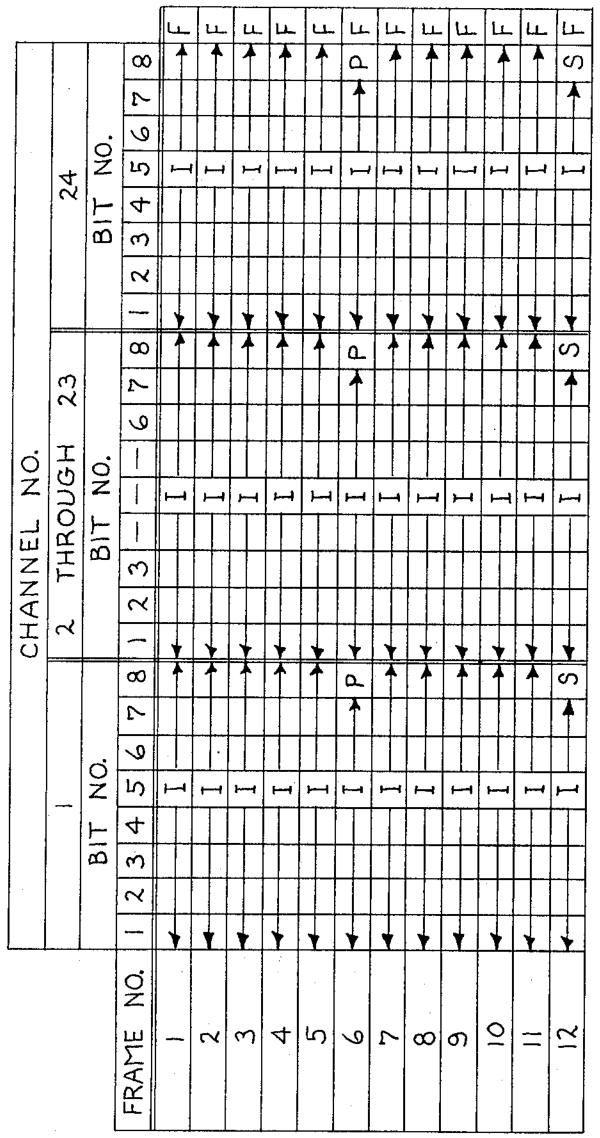
FIG. 2 shows a table giving the make-up of the channels in each of the twelve frames forming a superframe in the system of FIG. 1.

FIG. 1 shows a block diagram of one terminal of a D2/D3 carrier system utilizing our improved alarm arrangement in a transmitter and in a receiver. The upper portion of FIG. 1 shows the transmitter and the lower portions shows the receiver. The transmitter shown in FIG. 1 is connected over a T-1 transmission line to a distant terminal receiver which could take the form of the receiver shown in the lower part of FIG. 1. Similarly, a distant terminal transmitter, which may be similar to the transmitter shown in FIG. 1, is connected over a T-1 transmission line to the receiver shown in the lower part of FIG. 1. Since a typical voice channel for telephone use has an upper frequency limit of less than 4,000 hertz, an amplitude-sampling rate of twice this, or 8,000 hertz or pulses per second, has been selected in accordance with good engineering practice. Such a sampling rate insures reasonably good fidelity and quality for ordinary telephone conversations. The D2/D3 system provides 24 voice channels. In order that each voice channel amplitude sample can be adequately represented, 128 positive quantizing steps or amplitude levels and 128 negative quantizing steps or amplitude levels are recognized. This represents a total of 256 different steps or levels which, in binary codes, require eight digits or bits. The first bit represents a positive or negative amplitude level. The second through the seventh bits respectively represent amplitude levels of 64, 32, 16, 8, 4, and 2. The eighth bit is the least significant, and represents an amplitude level of 1. As shown in FIG. 2, each of the 24 channels comprises eight information bits which total 192 bits. In addition, a single framing bit F is added at the end of channel 24 for framing or synchronization, so that each frame comprises a total of 193 bits. If 8,000 samples per channel are taken per second, the bit rate is 8,000 multiplied by 193, or 1.544 million pulses or bits per second.

In the transmitter, a timing circuit 10 supplies the basic clock or pulse frequency of 1.544 million pulses per second, and in addition, the following: channel pulses CP1 through CP24 for timing each of the channels; bit pulses BP1 through BP8; and framing pulses FP1 through FP12 for timing each of the frames. Voice or information signals from the 24 channels are respectively applied to voice gates 11 which sample the amplitude of each of the voice channels and sequentially combine them and apply them to an encoder 12. The encoder 12 converts the amplitude samples into the pulses that are binary coded to represent the polarity and amplitude of each sampled channel. These coded pulses are placed in sequence and applied to a combiner 13 which provides the sequence of pulses at the rate of 1.544 million pulses per second and applies the pulses to a T1 line. Signaling signals for the 24 channels are respectively applied to signal gates 14 which treat the signals as either being primary, such as channel idle or busy and dial pulsing, or secondary, such as automatic number identification. Previously, the primary and secondary signaling was connected directly from the signal gates 14 to the combiner 13. The combiner 13 inserts the signals, when present, in the eighth bit of each channel of frame 6 for the primary signaling, as indicated by the letter P in FIG. 2, and in the eighth bit of each channel of frame 12 for the secondary signaling, as indicated by the letter S in FIG. 2. The combined pulses are applied to the T-1 line for transmission to a distant receiver. In accordance with our invention, we simply place an alarm circuit 15 in series with the signaling and use the existing channel pulses to provide alarm functions, as will be explained subsequently.

In the receiver shown in the lower portion of FIG. 1, pulses from a distant transmitter are received over a T-1 line at the 1.544 million pulses per second rate. These pulses are supplied to a decombiner 18 which separates the bits representing voice or information from the bits representing signaling. The bits representing voice are applied to a decoder circuit 19 which converts the coded pulses into amplitude samples, and applies them to voice gates 20. The voice gates 20 respectively apply the expanded signals to the respective voice channels 1 through 24. Similarly, the primary and secondary signaling bits are applied to signal gates 21 which respectively apply these signal bits to the respective channels 1 through 24. In addition, a timing circuit 22 is provided to recreate the timing functions represented by framing pulses, channel pulses, and bit pulses. This timing circuit 22 utilizes the framing bit F in order to insure that the receiver is in synchronization with the distant transmitter. An alarm circuit 23 in accordance with our invention is simply added in parallel with the primary and secondary signaling and uses existing timing pulses to provide the additional alarm function outputs as will be explained subsequently.

The D2/D3 system described thus far in connection with FIGS. 1 and 2 is known in the art, and as previously mentioned, the transmitter of FIG. 1 is connected to a distant receiver not shown, and the receiver of FIG. 1 is connected to a distant transmitter also not shown.

Figure 3:
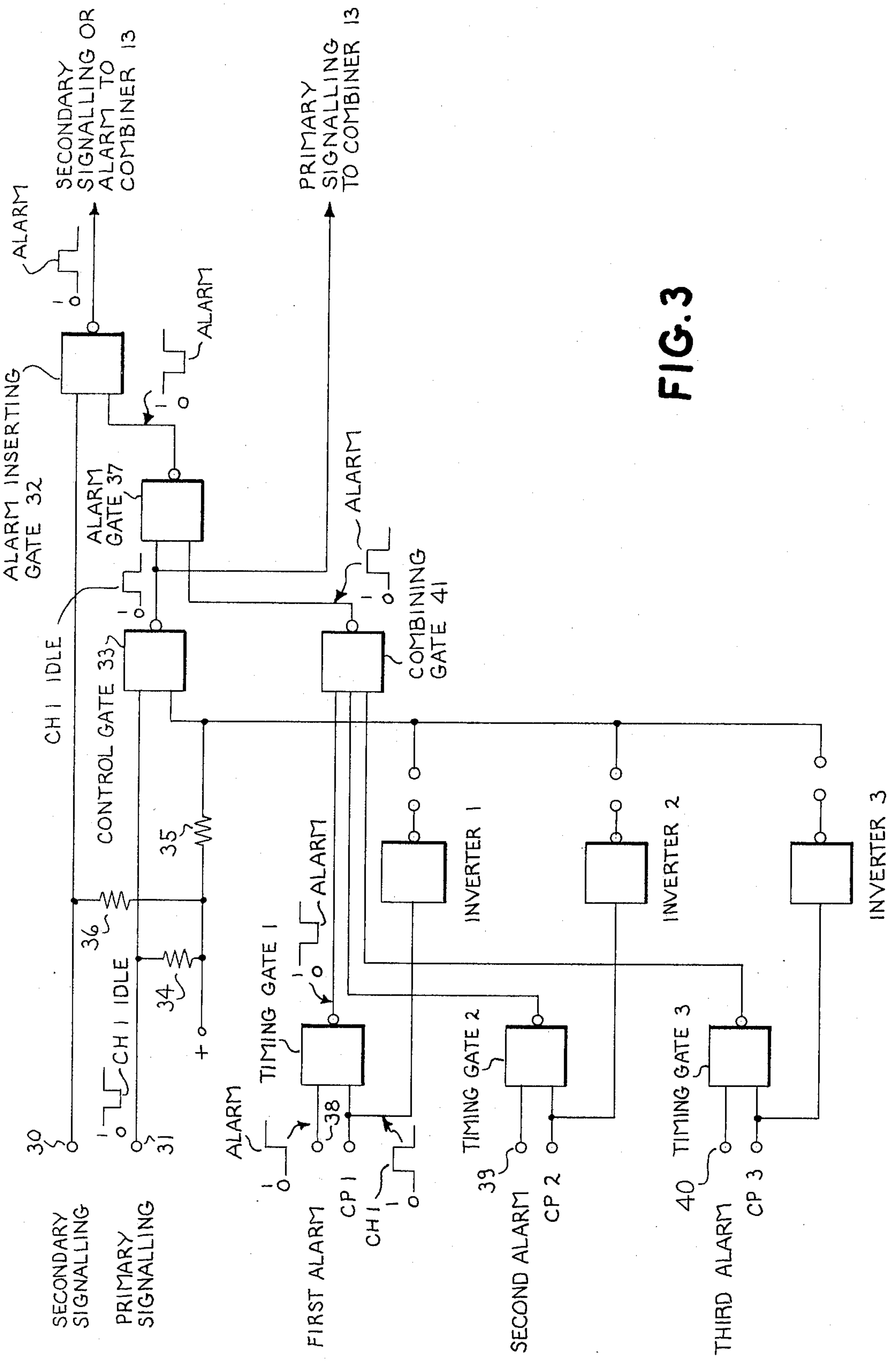
FIG. 3 shows a circuit diagram of an alarm circuit in accordance with our invention as used in the transmitter of FIG. 1.
Figure 4:
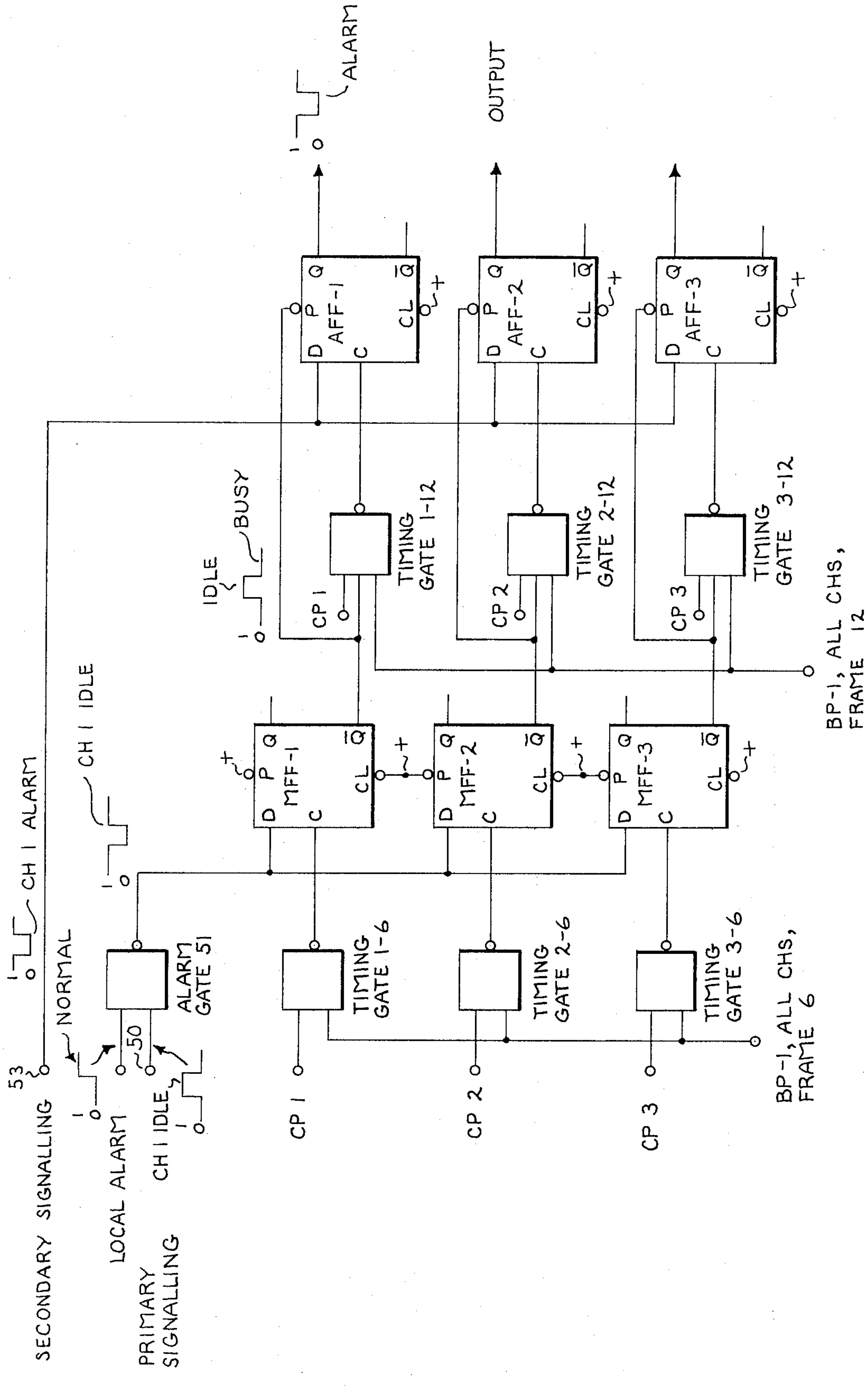
FIG. 4 shows a schematic diagram of an alarm circuit in accordance with our invention as used in the receiver of FIG. 1.

Studies have shown that the channels of a carrier system, such as the D2/D3 system, are frequently idle. And since, in some cases, it is desirable that an alarm function be provided in the system without the addition of more channels or timing functions, we have provided an arrangement which can provide as many different alarm functions as there are channels. Thus in the D2/D3 carrier system described, our arrangement can provide 24 alarm functions. FIG. 3 shows a circuit diagram of our alarm circuit 15 in the transmitter portion of FIG. 1, and FIG. 4 shows a circuit diagram of our alarm circuit 23 in receiver portion of FIG. 1. In order to keep FIGS. 3 and 4 relatively simple, we have assumed that only three alarm functions are to be provided. However, it is to be understood that as few as one alarm function or as many alarm functions as there are channels can be provided.

The circuit of FIG. 3 utilizes a number of logic gates known as positive NAND gates. As known in the art, a positive NAND gate may have a plurality of inputs which, if all a logic 1, causes the output to be a logic 0. If any of the inputs is a logic 0, then the output is a logic 1. The secondary signaling and the primary signaling are applied to the terminals 30, 31 respectively. This secondary signaling is derived from the signal gates 14, and when transmitted, occupies bit 8 of each of the channels in frame 12 as shown by the letter S in FIG. 2. The secondary signaling is applied to one input of an alarm inserting gate 32, and this gate 32 either passes the secondary signal, if present, or an alarm signal, if the respective channel is idle, to the combiner 13. The signal applied to the combiner 13 may be inverted, depending upon the type of system being used. The primary signaling is applied to one input of a control gate 33. Both inputs of the control gate 33 are connected to a source of positive current voltage (a logic 1) through resistors 34, 35 respectively. Thus both inputs to the gate 33 are at a logic 1 unless one or both of its inputs is switched to a logic 0 which will predominate over the logic 1. The control gate 33 has its output connected to an alarm gate 37, and also to the combiner 13. When the input from the primary signaling is a logic 0, representing an idle condition for a particular channel, the control gate 33 provides a logic 1 to an input of an alarm gate 37 to permit an alarm to be passed if present, and also provides a logic 1 (for idle) to the combiner 13. The signal applied to the combiner 13 may be inverted, depending upon the type of system being used. The output of the alarm gate 37 is connected to the other input of the alarm inserting gate 32.

The three alarm inputs are respectively applied to first, second, and third alarm input terminals 38, 39, 40 which, in turn, are connected to one input of respective timing gates 1, 2, and 3. The signals representing channel times, designated channel pulses CP1, CP2, CP3, are connected to the other inputs of the respective timing gates 1, 2, and 3. The outputs of the timing gates 1, 2, and 3 are respectively connected to the three inputs of a combining gate 41. The output of the combining gate 41, which supplies an alarm for a particular channel when present, is connected to the other input of the alarm gate 37. These channel pulses CP1, CP2, CP3 are also respectively connected to inverters 1, 2, and 3 which simply invert the logic function. The outputs of the inverters 1, 2, and 3 may be connected to the input of the control gate 33 by a connection between the two terminals at the outputs of the inverters.

To assist in understanding the operation of our alarm of FIG. 3, we have assumed that an alarm condition is present for the first alarm (which is transmitted over channel 1). We have also assumed that channel 1 is idle. As shown by the wave form adjacent the primary signaling input terminal 31, when channel 1 occurs, its idle condition is represented by a logic 0. This causes the control gate 33 to produce a logic 1 or open signal which is applied to the alarm gate 37. With this open signal, alarm conditions at the other input of the alarm gate 37 may be passed by the alarm gate 37. The alarm condition is indicated by a logic 1, as shown by the wave form adjacent the first alarm input terminal 38. During the occurrence of channel 1, a logic 1 is produced at the channel pulse input. Hence, with an alarm and during the time of channel 1, both inputs to the timing gate 1 are at a logic 1 so that its output is a logic 0 as indicated by the wave form. This logic 0 is applied to the combining gate 41 so that the output of the gate 41 becomes a logic 1 representing the alarm condition at the time of channel 1. This coincides with the logic 1 of the channel 1 idle condition, so that both inputs of the alarm gate 37 are at logic 1. The alarm gate 37 produces a logic 0 which causes the alarm inserting gate 32 to produce a logic 1 representing an alarm condition, this logic 1 occurring at the channel 1 time. This logic 1 is applied through the secondary lead to the transmitter combiner 13 for application to the line.

If channel 1 had been busy during the time that the first alarm was present, the primary signaling at the input terminal 31 would be a logic 1. This logic 1 and the logic 1 supplied by the resistor 35 cause the control gate 33 to produce a logic 0 or close signal so that the alarm gate 37 cannot pass an alarm signal. Whatever primary signaling condition (idle or busy) is present is passed by the control gate 33 to the combiner 13. If there is no alarm present at its respective channel time, the timing gate produces a logic 1. All other inputs to the combining gate 41 are a logic 1 and the gate 41 produces a logic 0. This causes the alarm gate 37 to produce a logic 1 which permits the alarm inserting gate 32 to pass secondary signaling.

The inverters 1, 2, 3 invert their respective channel pulses and, if an inverter output is connected to the control gate 33, a logic 0 is applied to the control gate for the time period of the particular or respective channel. This feature is provided for each channel that is not equipped to be used so that the condition of the unequipped channel can be forced from the natural busy condition to the idle condition, thus allowing alarm transmission.

FIG. 4 shows a circuit diagram of our alarm circuit 23 used in the receiver of the system of FIG. 1. In addition to positive NAND gates, FIG. 4 utilizes what is designated a D type flip-flop. Such a flip-flop has a steering or D input which determines the state of the flip-flop when a subsequent clock pulse is applied to the C input. If the D input is at a logic 1, followed by a clock pulse, then the Q output becomes a logic 1 and the $\bar{Q}$ output becomes a logic 0 (set condition). If the D input is at a logic 0, followed by a clock pulse, then the Q output becomes a logic 0 and the $\bar{Q}$ output becomes a logic 1 (reset condition). These functions depend upon a preset input P being at a positive voltage or logic 1 and a clearing input CL also being at a positive voltage or logic 1. When the P input is at a logic 0, then the flip-flop remains in the set condition where its Q output is at a logic 1 and its $\bar{Q}$ output is at a logic 0. When the CL input is at a logic 0, then the flip-flop remains in the reset (or cleared) condition with its Q output at a logic 0 and its $\bar{Q}$ output at a logic 1.

In FIG. 4, three memory flip-flops MFF-1, MFF-2, MFF-3 are provided in order to store the idle condition of each of the three assumed alarm channels 1, 2, and 3. The alarm signals are applied to an input terminal 50 which is connected to one input of an alarm gate 51. The other input of the alarm gate 51 may, if desired, be connected to a local alarm signal. We have found the local alarm signal desirable to block the alarm gate 51 if the system is out of frame or synchronization. If the system is functioning properly, we have assumed the local alarm signal to be at a logic 1. The output of the alarm gate 51 is connected to each of the D inputs of the memory flip-flops MFF-1, MFF-2, MFF-3. Each of the clock inputs C of these flip-flops MFF-1, MFF-2, MFF-3 is respectively connected to an output of timing gates 1-6, 2-6, 3-6 which produce clock pulses at the simultaneous occurrence of their channel pulses CP-1, CP-2, CP-3, and the first bit pulses BP-1 in frame 6 only. And each of the P and CL inputs of the memory flip-flops MFF-1, MFF-2, MFF-3 are connected to a positive voltage (which is logic 1) so that the D inputs are operational. Each of the $\bar{Q}$ outputs of the memory flip-flops MFF-1, MFF-2, MFF-3 is respectively connected to a preset input P of alarm gates or flip-flops AFF-1, AFF-2, AFF-3 as shown. Each of the clock inputs C of the alarm flip-flops AFF-1, AFF-2, AFF-3 is supplied with pulses from respective timing gates 1-12, 2-12, 3-12. These gates produce clock pulses at the simultaneous occurrence of their channel pulses CP-1, CP-2, and CP-3 and the first bit pulses BP-1 in frame 12 only, if the $\bar{Q}$ output of their respective memory flip-flops MFF-1, MFF-2, MFF-3 is at logic 1. The D inputs of the flip-flops AFF-1, AFF-2, AFF-3 are connected to a secondary signaling terminal 53 which receives the alarm pulses, if present, at respective channel times. These inputs may have to be inverted, depending on the type of system being used. The Q outputs of the alarm flip-flops AFF-1, AFF-2, AFF-3 are used to provide an alarm signal. The clear inputs CL are connected to a positive voltage (logic 1) so that the D inputs are operational whenever the preset inputs are at a logic 1.

As in the explanation of FIG. 3, we have assumed that channel 1 is idle and that the first alarm is present. The alarm gate 51 produces a logic 0 at the time of channel 1 in frame 6, since the primary signaling occurs only in frame 6. This provides a logic 1 to all D inputs, but only one of the flip-flops, in this case flip-flop MFF-1, receives a clock pulse from its timing gate 1-6 at the appropriate time. This causes the memory flip-flop MFF-1 to assume the reset condition where its $\bar{Q}$ output is a logic 1, as indicated by the wave form at the $\bar{Q}$ output of the flip-flop MFF-1. This condition is stored or held until the next occurrence of frame 6, and provides the desired logic 1 at the preset input P of the alarm flip-flop AFF-1. If the other channels 2 and 3 are busy, the alarm gate 51 produces a logic 1 at those times which causes the flip-flops MFF-2 and MFF-3 to be placed in the set condition where their $\bar{Q}$ outputs are a logic 0. Thus, the preset input P of the alarm flip-flop AFF-1 is a logic 1 which is the condition that permits the clock input C and D input to control but the preset inputs P of the alarm flip-flops AFF-2 and AFF-3 are a logic 0 so that these flip-flops AFF-2 and AFF-3 are held in the set condition where their Q outputs are a logic 1, regardless of what occurs at their D and C inputs. When an alarm during channel 1 time of frame 12 is received at the secondary signaling input terminal 53, this is indicated by a logic 0 at the D inputs. Subsequently, the timing gate 1-12 produces a clock pulse which occurs at the appropriate time for channel 1 in frame 12 and this causes the flip-flop AFF-1 to be placed in the reset condition where its Q output is a logic 0. This logic 0 can be used to indicate an alarm. But with respect to channels 2 and 3, even though their timing gates 2-12, 3-12 produce a clock signal, the flip-flops AFF-2 and AFF-3 are held by the logic 0 at their preset inputs P so that their Q outputs remain a logic 1 and no alarm signal is provided by them.

It will be seen that our alarm arrangement is relatively simple, and can be easily added to an existing D2/D3 carrier system to provide the additional alarm functions, without affecting or changing the timing or any other functions of the system. While we have shown only one embodiment of our alarm circuit for the transmitter and receiver of a D2/D3 carrier system, persons skilled in the art will appreciate that modifications may be made. As previously mentioned, our improved arrangement permits as many of the channels as desired to be used for alarm functions, this being provided by the addition of the appropriate logic circuits but without modification to the operation of the D2/D3 system. Also, visual or other types of indicators may be provided at the Q or $\overline{Q}$ outputs of the memory flip-flops MFF-1, MFF-2, MFF-3 and the Q or $\overline{Q}$ outputs of the alarm flip-flops AFF-1, AFF-2, AFF-3. Therefore, while our invention has been described with reference to a particular embodiment, it is to be understood that modifications may be made without departing from the spirit of our invention or from the scope of the claims.

What we claim as new and desire to secure by Letters Patent of the United States is:

1. In a multi-channel, time-division multiplex, pulse-code modulation carrier system having a distant transmitter and a near receiver, wherein a predetermined number of pulses representing each channel are sequentially combined to form a frame, wherein a predetermined number of frames form a superframe in which one predetermined frame is used for primary signaling for each channel and another predetermined frame is used for secondary signaling for each channel, an improved arrangement for transmitting alarm information from said distant transmitter to said near receiver, said distant transmitter comprising:

a. a plurality of input means, each of which is adapted to be supplied with a respective alarm signal at said distant transmitter;
b. means connected to said input means for combining signals therefrom in a time sequence corresponding to the channel sequence of the carrier system;
c. a control gate adapted to be connected to the source of primary signaling for producing an open signal in response to primary signaling indicating each idle channel and a close signal in response to primary signaling indicating each busy channel;
d. an alarm gate connected to said combining means and connected to said control gate output for passing an alarm signal in response to each open signal and for blocking alarm signals in response to each close signal;
e. and an inserting gate adapted to be connected to the source of secondary signaling and connected to said alarm gate for replacing said secondary signals in response to any alarm signals passed by said alarm gate;

and said near receiver comprising:

f. a plurality of memory devices adapted to be supplied with primary signaling for respectively indicating which of said channels are idle for the duration of a superframe;
g. and a plurality of alarm gates respectively connected to said memory devices and adapted to be connected to the source of secondary signaling, each of said alarm gates producing an alarm signal in response to an idle condition in its respective channel followed by an alarm signal in the same respective channel.

2. The improved arrangement of claim 1 wherein said memory devices and said alarm gates of said near receiver comprise flip-flops.

3. In a mutli-channel, time division multiplex, pulse-code modulation carrier system having a distant transmitter and a near receiver, wherein a predetermined number of pulses representing each channel are sequentially combined to form a frame, wherein a predetermined number of frames form a superframe in which a first predetermined frame is used for primary signaling for each channel and in which a second predetermined frame is used for secondary signaling for each channel, an improved arrangement for transmitting alarm information from said distant transmitter to said near receiver, said distant transmitter comprising:

a. a plurality of timing gates each having a first input adapted to be supplied with a respective alarm signal, having a second input adapted to be supplied with a respective channel timing pulse of said transmitter, and having an output which produces an alarm signal in response to the simultaneous presence of an alarm signal and a channel timing pulse at its inputs;
b. a combining gate having a plurality of inputs, each of which is respectively connected to the output of one of said timing gates, and having an output which produces a sequence of alarm signals in response to alarm signals from said timing gates;
c. an alarm gate having a first input adapted to be supplied with the primary signaling of said transmitter, having a second input connected to said combining gate output, and having an output which produces an alarm signal in response to the simultaneous presence of an idle signal from said primary signaling and an alarm signal from said combining gate;
d. an alarm inserting gate having a first input adapted to be supplied with the secondary signaling of said transmitter, having a second input connected to said alarm gate output, and having an output which produces an alarm signal in response to each alarm signal applied to said second input and which produces a secondary signaling in the absence of said alarm signal applied to said second input;
e. and means connected to said alarm inserting gate output for applying signals thereat to said transmitter;

and said near receiver comprising:

f. a plurality of first timing gates each having a first input adapted to be supplied with a respective channel timing pulse of said receiver, having a second input adapted to be supplied with a bit from each channel in the first predetermined frame for primary signaling, and having an output for producing a timing signal in response to the simultaneous presence of a channel pulse and said bit;

g. a plurality of memory flip-flops each having a steering input adapted to be supplied with the received primary signaling of said receiver, having a clock input connected to a respective output of one of said first timing gates, and having an output which indicates the idle condition of a respective channel;

h. a plurality of second timing gates each having a first input connected to a respective output of one of said memory flip-flops, having a second input adapted to be supplied with a bit from each channel in the second predetermined frame for secondary signaling, having a third input adapted to be supplied with a respective channel timing pusle of said receiver, and having an output for producing an output signal in response to the simultaneous presence of said bit, said channel pulse, and a stored idle condition;

i. and a plurality of output flip-flops each having a preset input connected to a respective output of one of said memory flip-flops, a steering input adapted to be supplied with the received secondary signaling of said receiver, having a clock input connected to a respective output of one of said second timing gates, and having an output for producing an alarm signal in response to an idle indication at its preset input followed by an alarm signal at its steering input and an output signal from its respective second timing gate.

* * * * *